United States Patent
Ballentine (10) Patent No.: US 11,073,238 B2
(45) Date of Patent: Jul. 27, 2021

(54) CONVERTIBLE HIKING STICKS

(71) Applicant: Trent Ballentine, Carrollton, TX (US)

(72) Inventor: Trent Ballentine, Carrollton, TX (US)

( * ) Notice: Subject to any disclaimer, the term of this patent is extended or adjusted under 35 U.S.C. 154(b) by 0 days.

(21) Appl. No.: 16/898,947

(22) Filed: Jun. 11, 2020

(65) Prior Publication Data
US 2020/0390204 A1 Dec. 17, 2020

Related U.S. Application Data (60) Provisional application No. 62/861,870, filed on Jun. 14, 2019.

(51) Int. Cl.
| | |
|---|---|
| *F16M 13/08* | (2006.01) |
| *A45B 5/00* | (2006.01) |
| *A45B 7/00* | (2006.01) |
| *A45B 9/02* | (2006.01) |
| *F16M 11/24* | (2006.01) |
| *A45B 9/00* | (2006.01) |
| *G03B 17/56* | (2021.01) |

(52) U.S. Cl.
CPC .............. *F16M 13/08* (2013.01); *A45B 5/00* (2013.01); *A45B 7/00* (2013.01); *A45B 9/02* (2013.01); *A45B 2009/005* (2013.01); *A45B 2009/007* (2013.01); *F16M 11/242* (2013.01); *G03B 17/561* (2013.01)

(58) Field of Classification Search
CPC ............. A45B 5/00; A45B 7/00; F16M 13/08
See application file for complete search history.

(56) References Cited

U.S. PATENT DOCUMENTS

| | | | | |
|---|---|---|---|---|
| 194,175 | A | * 8/1877 | Reynolds | A45B 5/00 |
| | | | | 248/155.4 |
| 473,357 | A | * 4/1892 | Serves | F16M 11/247 |
| | | | | 248/155 |
| 504,326 | A | * 9/1893 | Chapman | A45B 5/00 |
| | | | | 248/155.1 |
| 1,063,106 | A | 5/1913 | Bell | |
| 1,138,417 | A | 5/1915 | Rottenbug | |
| 1,319,397 | A | 10/1919 | Kelsey | |
| 2,690,211 | A | * 9/1954 | Wentz | A45B 5/00 |
| | | | | 248/155.1 |
| 2,844,345 | A | * 7/1958 | Sherman | F16M 13/00 |
| | | | | 248/122.1 |
| D261,199 | S | 10/1981 | Dockery | |

(Continued)

FOREIGN PATENT DOCUMENTS

| | | | | |
|---|---|---|---|---|
| DE | | 494905 C | * 3/1930 | A45B 5/00 |
| DE | 29718507 U1 | * 12/1997 | | A45B 3/00 |

(Continued)

*Primary Examiner* — David R Dunn
*Assistant Examiner* — Danielle Jackson
(74) *Attorney, Agent, or Firm* — Andrus Intellectual Property Law, LLP (57) ABSTRACT

A convertible hiking stick includes a handle extending along a center axis and a first leg and a second leg that couple to the handle and extend along the center axis. The hiking stick is convertible into a tripod such that the first leg is in a first bore of the handle, the second leg is in a second bore of the handle, the first leg extends transverse to the second leg, and the first leg, the second leg, and the handle together support the hiking stick with respect to a surface.

18 Claims, 8 Drawing Sheets

(56) References Cited

U.S. PATENT DOCUMENTS

| | | |
|---|---|---|
| D274,100 S | 6/1984 | Axton |
| D285,861 S | 9/1986 | Jackson |
| 4,742,837 A | 5/1988 | Rise |
| D297,887 S | 10/1988 | Hattersley |
| 4,796,648 A | 1/1989 | Goulter |
| 5,482,072 A | 1/1996 | Cimino |
| D368,011 S | 3/1996 | McCoy |
| D383,049 S | 9/1997 | Concari |
| D396,742 S | 8/1998 | Raymond |
| D448,152 S * | 9/2001 | Folise ................ D3/7 |
| D448,153 S | 9/2001 | Folise |
| D517,795 S | 3/2006 | Mival |
| D518,630 S | 4/2006 | Mival |
| D553,848 S | 10/2007 | Barker |
| D661,964 S | 6/2012 | Pangborn |
| 8,960,211 B2 | 2/2015 | Eng |
| 9,044,072 B2 | 6/2015 | Lindsay |
| D745,260 S | 12/2015 | Kosuge |
| 9,609,925 B2 | 4/2017 | Lenhart |
| 10,264,860 B1 | 4/2019 | Rau |
| D880,144 S | 4/2020 | Nelson |
| D894,586 S * | 9/2020 | Ballentine ................ D3/12 |
| 10,856,629 B1 * | 12/2020 | Unice ................ A45B 1/00 |
| 2004/0066064 A1 * | 4/2004 | Neely ................ A47C 9/105 |
| | | 297/118 |
| 2005/0150532 A1 | 7/2005 | Lin |
| 2010/0038498 A1 * | 2/2010 | Enos ................ F16M 11/16 |
| | | 248/163.2 |
| 2015/0056002 A1 * | 2/2015 | Olds ................ F16M 11/16 |
| | | 403/176 |
| 2020/0337424 A1 * | 10/2020 | Friederich ................ A45B 9/02 |

FOREIGN PATENT DOCUMENTS

| | | | | |
|---|---|---|---|---|
| FR | 624929 A | * | 7/1927 | ............ A45B 5/00 |
| FR | 668962 A | * | 11/1929 | ............ F16M 11/32 |
| GB | 191321326 A | * | 9/1914 | ............ A45B 5/00 |
| GB | 188153 A | * | 11/1922 | ............ A45B 1/00 |
| GB | 281964 A | * | 12/1927 | ............ A45B 5/00 |
| KR | 20150123044 A | * | 11/2015 | |

* cited by examiner

CONVERTIBLE HIKING STICKS

CROSS-REFERENCE TO RELATED APPLICATION

The present disclosure is based on and claims priority to U.S. Provisional Patent Application No. 62/861,780 filed Jun. 14, 2019, the disclosure of which is incorporated herein by reference.

FIELD

The present disclosure relates to personal hiking equipment and specifically to convertible hiking sticks that convert into tripods for supporting objects, such as cameras, thereon.

BACKGROUND

Hikers use hiking sticks to traverse difficult terrain, and hikers also use hiking sticks on moderate- and easy-difficulty trails and/or to clear brush. In addition to hiking sticks, hikers may carry other objects with them. These objects can include water, food, first aid equipment, camera equipment, camera tripod, and/or additional clothes. However, hikers often seek to minimize the number of objects they carry to thereby reduce the weight they carry.

The present inventor recognized hikers often pack a camera tripod for use during the hike. However, conventional camera tripods are often cumbersome, bulky, and/or heavy. Accordingly, the present inventor endeavored to develop hiking sticks that are convertible into tripods such that the hiker does not need to pack a separate conventional camera tripod. Through research and development, the present inventor has developed the convertible hiking sticks disclosed herein below.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a convertible hiking stick includes a handle extending along a center axis and a first leg and a second leg that couple to the handle and extend along the center axis. The hiking stick is convertible into a tripod such that the first leg is in a first bore of the handle, the second leg is in a second bore of the handle, the first leg extends transverse to the second leg, and the first leg, the second leg, and the handle together support the hiking stick with respect to a surface.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
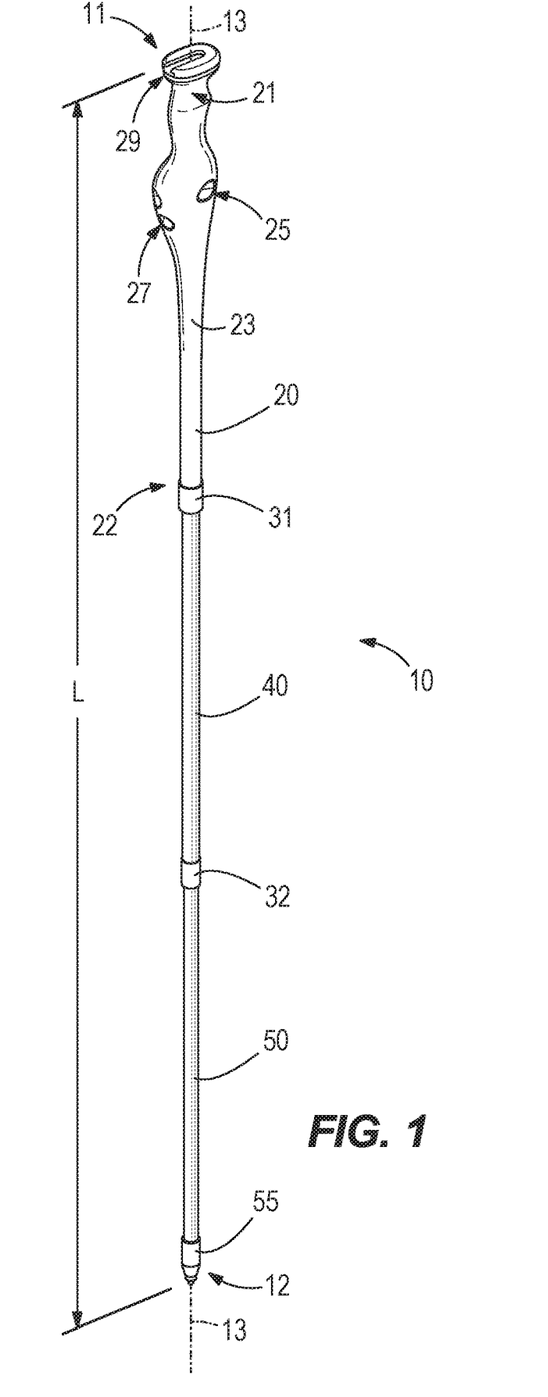
FIG. 1 a perspective view of an example hiking stick of the present disclosure in a hiking configuration.
Figure 2:
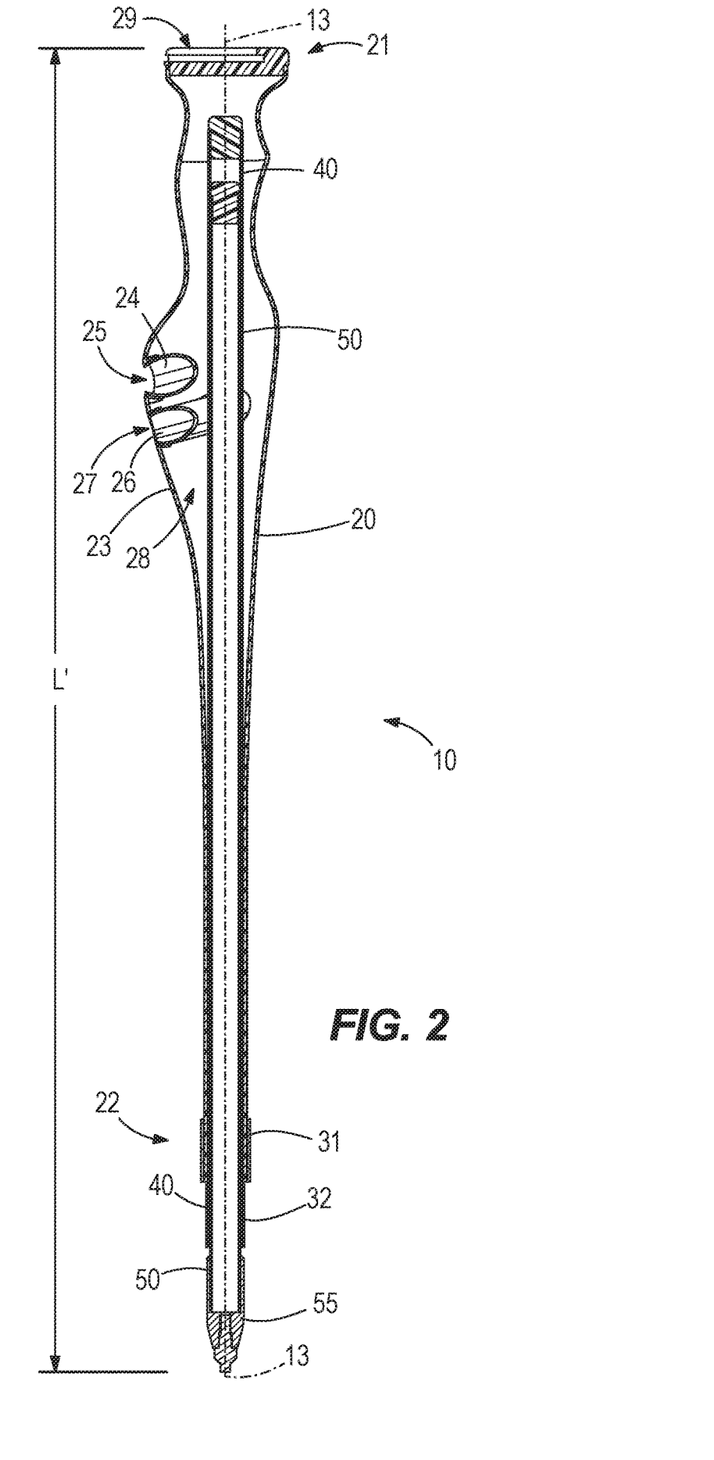
FIG. 2 is a cross-sectional view of the hiking stick. The hiking stick is in a storage configuration in which legs are within a handle.
Figure 3:
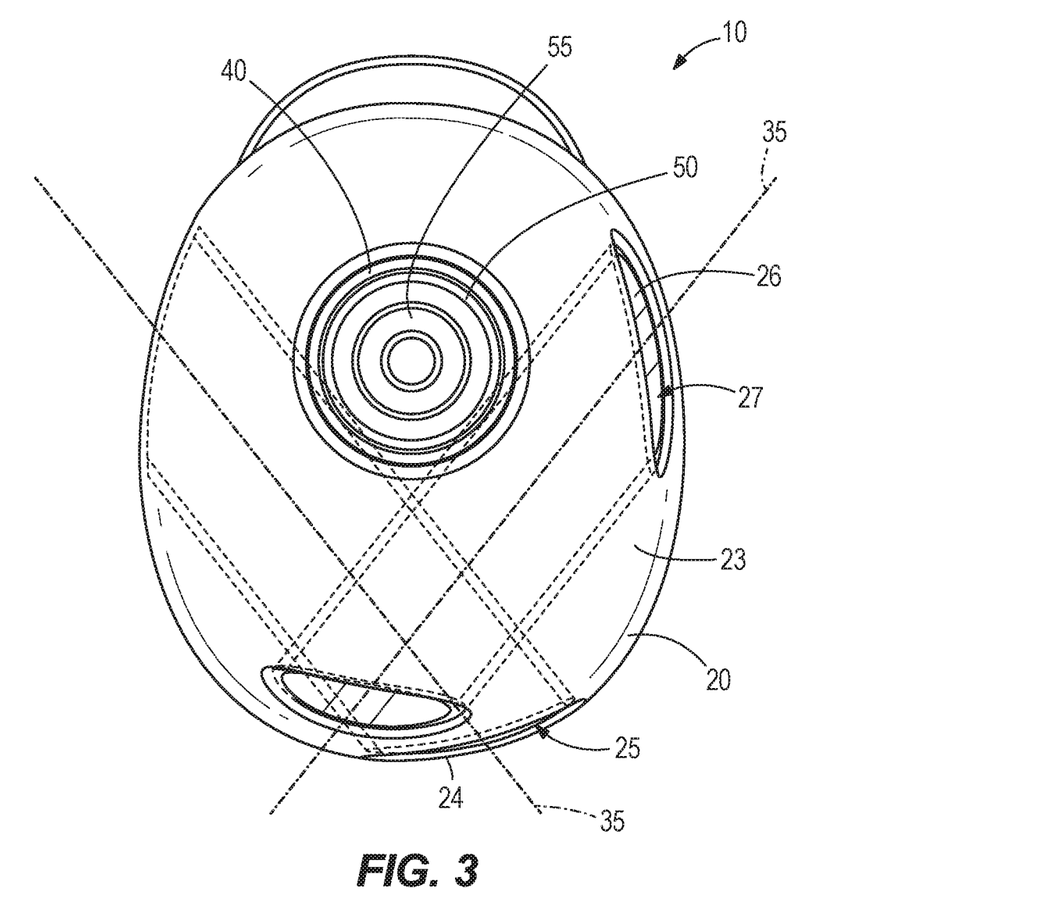
FIG. 3 is a bottom-up plan view of the hiking stick.

FIGS. 1-3 depict an example hiking stick 10 of the present disclosure. The hiking stick 10 generally extends along a center axis 13 between a first or handle end 11 and an opposite, second or ground-engaging end 12. The hiking stick 10 is movable into different configurations. For example, FIG. 1 depicts the hiking stick 10 in a hiking configuration in which the hiking stick 10 is useful during hikes, and FIGS. 2-3 depict the hiking stick in a storage configuration in which legs 40, 50 are retracted into a handle 20.

The handle 20 extends along the center axis 13 between a first handle end 21 and an opposite second handle end 22. The handle 20 also has an exterior surface 23, a first interior surface 24 (FIGS. 4-5) defining a first bore 25, and a second interior surface 26 (FIGS. 4-5) defining a second bore 27. An interior space 28 (FIG. 2) of the handle 20 is accessible through an opening (not shown) in the second end 22 of the handle 20. The interior surfaces 24, 26 extend into the interior space 28 (FIG. 2).

The legs, namely a first leg 40 and a second leg 50, are coupled to the handle 20 and extend along the center axis 13 when the hiking stick 10 is in the hiking configuration (FIG. 1) and the storage configuration (FIGS. 2-3). In the example depicted in the FIGS. 1-3, the legs 40, 50 are hollow (e.g., the legs 40, 50 have center bores extending along the center axis 13), and the legs 40, 50 are capable of telescoping relative to each other and the handle 20 such that the hiker can adjust the overall length (see length L on FIG. 1) of the hiking stick 10. For example, the hiker may move a portion of the second leg 50 into the hollow interior of the first leg 40 to thereby decrease the overall length L of the hiking stick 10. Similarly, the hiker may move a portion of the first leg 40 into the interior space 28 (FIG. 2) to further decrease the overall length L of the hiking stick 10 (see length L' on FIG. 2). The hiker engages fittings 31, 32 to lock movement of the handle 20 and/or the legs 40, 50 relative to each other and thereby prevent inadvertent movement of the handle 20 and/or the legs 40, 50 relative to each other. Thus, the fittings 31, 32 help the hiker set or lock the overall length of the hiking stick 10.

In one example, a first fitting 31 on the second handle end 22 selectively engages the first leg 40 to thereby couple the first leg 40 to the handle 20. When the first fitting 31 engages the first leg 40, the first fitting 31 prevents the first leg 40 from moving relative to the handle 20 along the center axis 13. A second fitting 32 on the first leg 40 selectively engages the second leg 50 to thereby couple the second leg 50 to the first leg 40. When the second fitting 32 engages the second leg 50, the second fitting 32 prevents the second leg 50 from moving relative to the first leg 40 along the center axis 13.

The fittings 31, 32 are any suitable device capable of locking onto the legs 40, 50 and/or fixing the legs 40, 50 relative to each other and/or the handle 20. In one non-limiting example, the fittings 31, 32 are nut and bolt assemblies that extend through holes (not shown) in the handle 20 and/or the legs 40, 50. In another non-limiting example, the fittings 31, 32 are clamps that clamp onto the legs 40, 50.

The handle 20 and the legs 40, 50 are formed from any suitable material such as metal alloy, carbon fiber, plastic, wood, and the like. In certain examples, the handle 20 and/or the legs 40, 50 are formed with an aluminum alloy bonded to a carbon fiber tube with plastic tips or fittings. In another example, the handle 20 and/or the legs 40, 50 are formed with an aluminum alloy and carbon fiber tubes. In still other examples, the handle 20 and/or the legs 40, 50 are formed with only carbon fiber components. In certain examples, the handle 20 and/or the legs 40, 50 are coated with a sealant. In one example, the second leg 50 has a ground engaging spike 55.

As noted above, and depicted in FIGS. 2-3, the hiking stick 10 is movable into a storage configuration in which legs 40, 50 are retracted in the interior space 28 of the handle 20. The hiker may find it advantageous to retract the legs 40, 50 into the interior space 28 when the hiking stick 10 is not in use to thereby minimize the length of the hiking stick 10. Note that the second leg 50 fits into the hollow interior of the first leg 40 and the first leg 40 fits into the interior space 28 of the handle 20.

Figure 4:
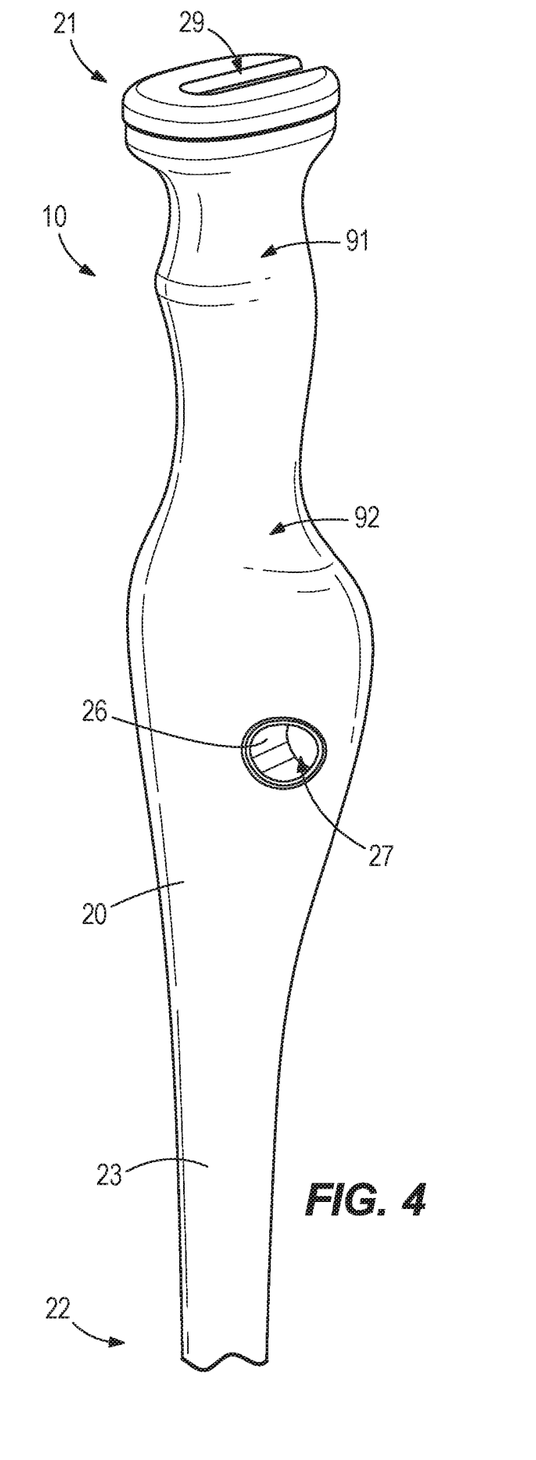
FIGS. 4-7 are enlarged perspective views of the handle.
Figure 5:
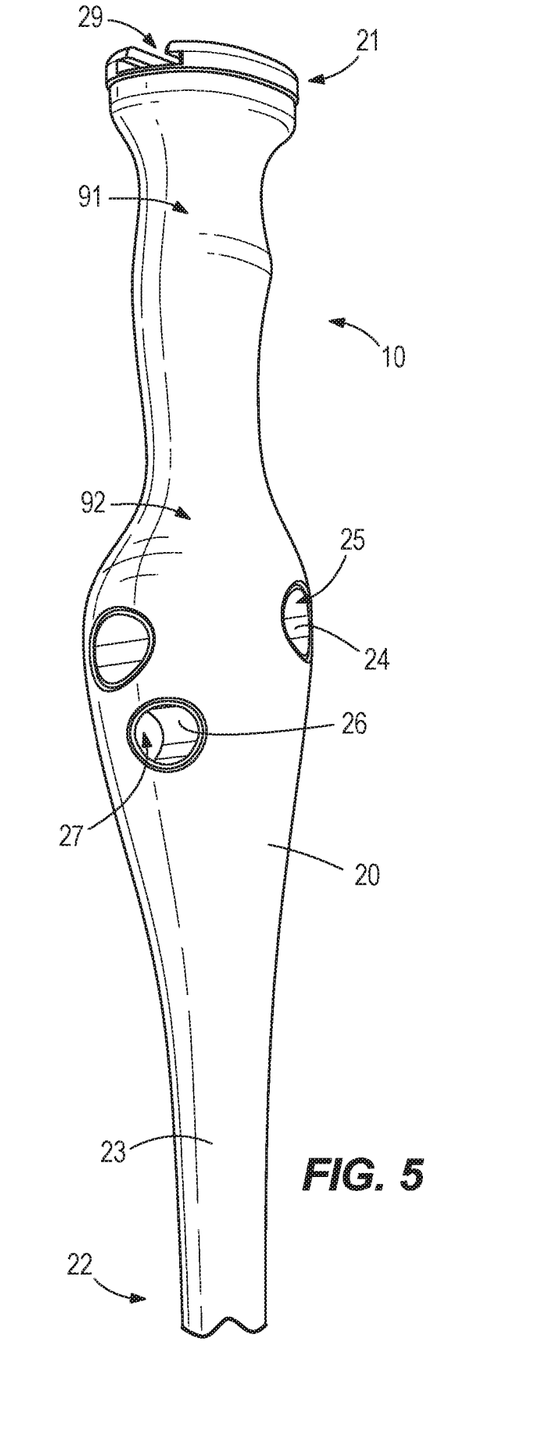

FIGS. 4-5 depict the handle 20 is greater detail. The first handle end 21 has a channel 29 configured to receive a removable camera mount 100 (see FIG. 8). The size and shape of the channel 29 can vary, and the channel 29 depicted in FIG. 4 has a linear shape. In certain examples, the channel 29 is a dovetail. When the removable camera mount 100 is in the channel 29, the hiker can connect a camera (not shown) to the hiking stick 10. Note that in other examples, the channel 29 directly receives the camera (not shown).

The first interior surface 24 and the second interior surface 26 define the first bore 25 and the second bore 27, respectively. The bores 25, 27 are through-bores that extend through the handle 20 such that each bore 25, 27 has two opposing open ends. Note that in other examples, the bores 25, 27 are closed-ended bores having one closed end such that the bores 25, 27 do not fully extend through the handle 20. The bores 25, 27 are spaced apart from each other along the handle 20, and the bores 25, 27 each extend along center bore axes 35 (see FIG. 3). The bores 25, 27 also extend transverse to each other, as depicted by the dashed lines of FIG. 3 that represent the bores 25, 27.

Figure 6:
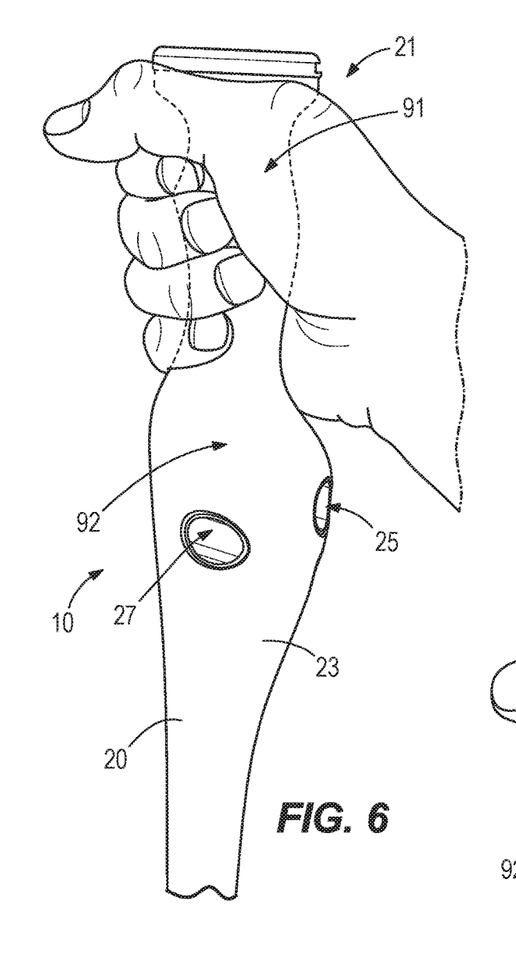
Figure 7:
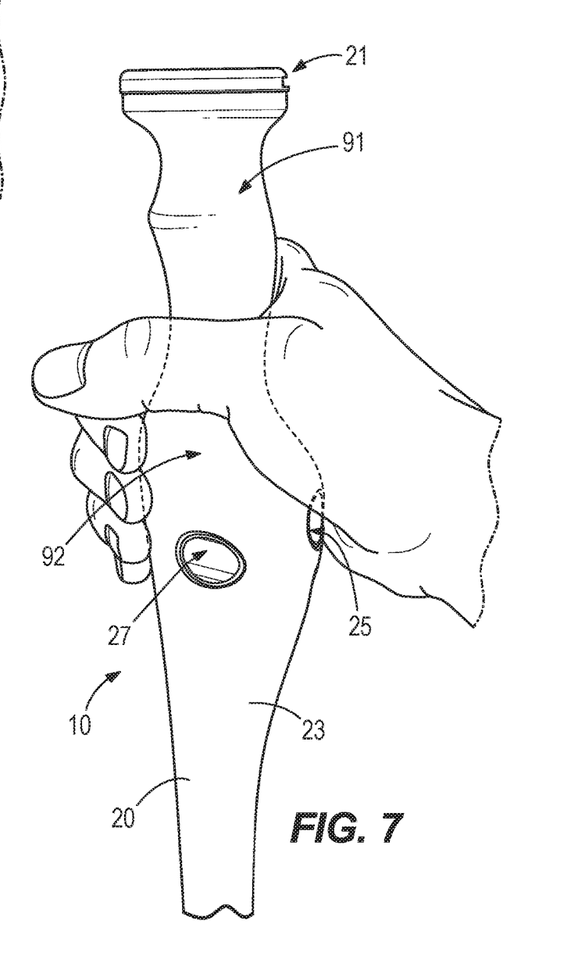

Referring to FIGS. 6-7 the exterior surface 23 of the handle 20 defines a pair of grips, namely a first or upper grip 91 and a second or lower grip 92. The grips 91, 92 are adjacent to each other on the exterior surface 23, and the hiker may selectively move their hand between the two grips 91, 92 while using the hiking stick 10 to prevent cramping or fatigue of their hand. For example, in FIG. 6 the hiker engages the first grip 91 and in FIG. 7 the hiker engages the second grip 92. Furthermore, the hiker may move their hand to one of the grips 91, 92 during specific hiking activities. For example, the hiker engages the second grip 92 to shorten the distance between the hiker's hand and the engaging ground end of the second leg 50.

Figure 8:
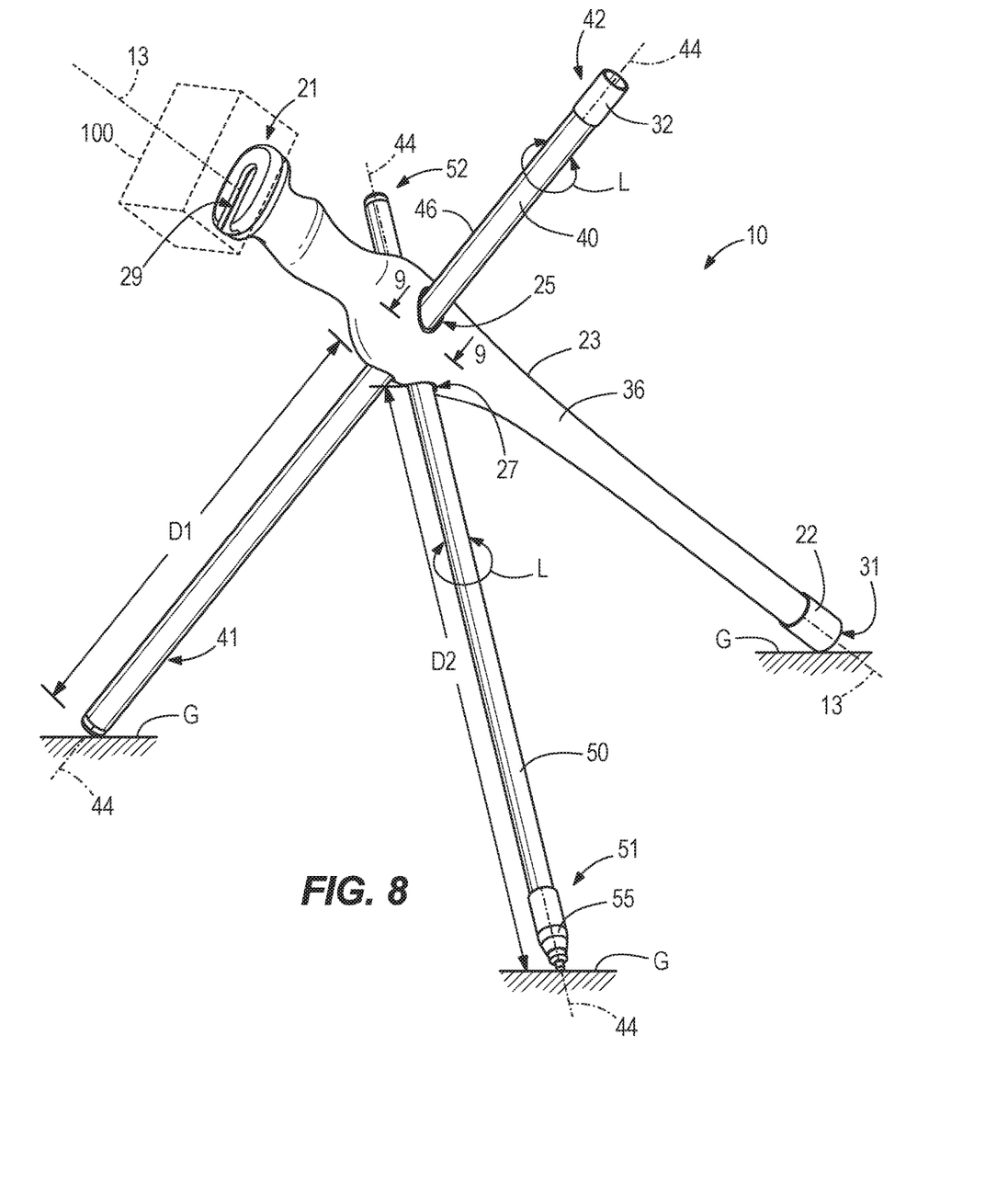
FIG. 8 is a perspective view of the hiking stick in a tripod configuration.

FIG. 8 depicts the hiking stick 10 in a tripod configuration in which the hiking stick 10 forms a tripod that supports an object, such as a removable camera mount 100 and/or a camera (not shown), thereon. While in the tripod configuration, the handle 20, the first leg 40, and the second leg 50 contact and support the hiking stick 10 with respect to a support surface(s), such as the ground G.

To convert the hiking stick 10 into the tripod (FIG. 8), the hiker disconnects the second leg 50 from the first leg 40 and disconnects the first leg 40 from the handle 20 (see FIG. 1). The hiker then slides the first leg 40 into the first bore 25 and the second leg 50 into the second bore 27. Accordingly, one end 41, 42 of the first leg 40 contacts the ground G, one end 51, 52 of the second leg 50 contacts the ground G, and the second handle end 22 contacts the ground G. As such, the hiking stick 10 contacts the ground G at three separate points and the handle 20 and the legs 40, 50 together support the hiking stick 10 relative to the ground G.

Figure 9:
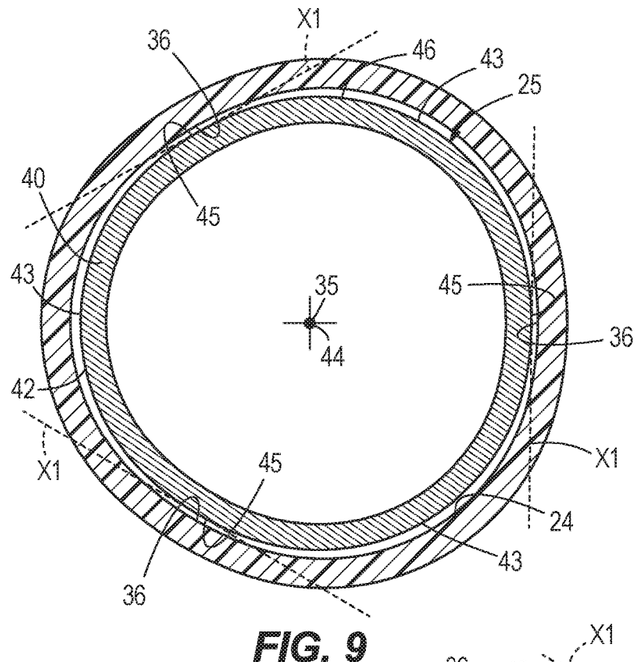
FIG. 9 is a cross-sectional view along line 9-9 in FIG. 8, showing the first leg in an unlocked position within a first bore of the handle.

Once the hiking stick 10 is in the tripod configuration (as shown on FIG. 8), the hiker can further slide the legs 40, 50 in the bores 25, 27 to thereby level the removable camera mount 100. The hiker levels the removable camera mount 100 by sliding the legs 40, 50 in the bores 25, 27 such that the length D1, D2 of the legs 40, 50 extending from the handle 20 toward the ground G changes. Accordingly, the hiker changes the overall shape of the tripod to thereby level the removable camera mount 100. Once the removable camera mount 100 is level (e.g., the removable camera mount 100 has an integral bubble level (not shown) thereon), the hiker rotates the first leg 40 in the first bore 25 into a locked position (FIG. 10) and rotates the second leg 50 in the second bore 27 (see rotation arrows L) into a locked position (FIG. 10) such that the legs 40, 50 engage the interior surfaces 24, 26, respectively. Thus, the legs 40, 50 lock to the handle 20 (e.g., the legs 40, 50 are in a "twist-lock" engagement with the interior surfaces 24, 26) and the legs 40, 50 do not move relative to the handle 20 and the legs 40, 50 (e.g., the legs 40, 50 do not inadvertently slide in the bores 25, 27). If the hiker subsequently desires to adjust the shape of the tripod or move the hiking stick 10 into the hiking configuration (FIG. 1), the hiker rotates the legs 40, 50 such that the legs 40, 50 disengage from the interior surfaces 24, 26 and are in unlocked positions (FIG. 9). The hiker can then slide the legs 40, 50 in the bores 25, 27. Note that hiker rotates the legs 40, 50 relative to a center leg axes 44 (see rotation arrows L on FIG. 8; see also FIGS. 9-10), and note that the legs 40, 50 extend between the ends 41, 42, 51, 52 respectively, along the center leg axes 44.

Figure 10:
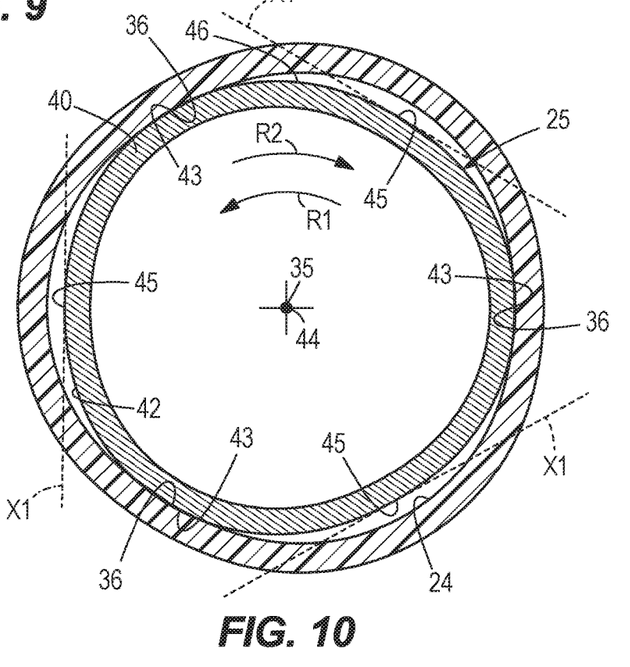
FIG. 10 is a cross-sectional view along line 9-9 in FIG. 8, showing the first leg in a locked position within the first bore of the handle.

Turning now to FIGS. 9-10, cross-sectional views of the first leg 40 within the first bore 25 are depicted. FIG. 9 depicts the first leg 40 in the unlocked position (FIG. 9), and FIG. 10 depicts the first leg 40 in the locked position (FIG. 10). Note that the features of the first leg 40 and the first bore 25 described herein below with respect to FIGS. 9-10 can apply to the second leg 50 and the second bore 27.

FIG. 9 depicts the first leg 40 in the first bore 25 and in the unlocked position. The perimeter of the first leg 40 is spaced apart from the first interior surface 24 such that the first leg 40 slides in the first bore 25. The leg 40 has a perimeter surface 46 with one or more locking surface 43 spaced apart thereon and flattened surfaces 45 between the locking surfaces 43. FIGS. 9-10 include dashed lines X1 that extend along and from the flattened surfaces 45. The locking surfaces 43 and the flattened surfaces 45 extend along the length of the first leg 40 (FIG. 8) between the ends 41, 42 (FIG. 8). Thus, the cross-sectional shape of the first leg 40 is generally consistent along the length of the first leg 40. The cross-sectional shape of the first leg 40 is non-cylindrical. The first leg 40 can have any number of locking surfaces 43 and flattened surfaces 45, and the first leg 40 depicted in FIGS. 9-10 has three locking surfaces 43 and three flattened surfaces 45.

The cross-sectional shape of the first bore 25 generally corresponds to the cross-sectional shape of the first leg 40, and the first interior surface 24 has one or more flattened surfaces 36. As the first leg 40 slides in the first bore 25, the flattened surfaces 45 of the first leg 40 freely slide along the flattened surfaces 36 of the first interior surface 24. The first interior surface 24 can have any number of flattened surfaces 36, and first interior surface 24 depicted in FIGS. 9-10 has three flattened surfaces 36. Note that the first bore 25 extends along a first bore axis 35 that extends along the leg axis 44.

FIG. 10 depicts the first leg 40 rotated (see rotation arrows R1, R2) into the locked position in which at least one locking surface 43 of the first leg 40 engages with a flattened surface 36 of the first interior surface 24. Thus, in the locked position, the first leg 40 locks to the first bore 25 (as described above). The first leg 40 or the handle 20 elastically deform as the legs 40, 50 move into the locked position (FIG. 10). Forces (e.g., compression forces, friction forces) between the first leg 40 and the first interior surface 24 maintain the first leg 40 in the locked position (FIG. 10).

To move the first leg 40 from the unlocked position (FIG. 9) into the locked position (FIG. 10), the hiker rotates the first leg 40 about the leg axis 44 in either the first direction (see arrow R1) or the second direction (see arrow R2). The amount of rotation necessary to move the first leg 40 into the locked position (FIG. 10) such that the locking surfaces 43 engage the flattened surfaces 36 of the first interior surface 24 can vary, and in the example depicted, the first leg 40 rotates 60.0 degrees from the unlocked position (FIG. 9) to the locked position (FIG. 10). To move the first leg 40 from the locked position (FIG. 10) to the unlocked position (FIG. 9), the hiker rotates the first leg 40 in either the first direction (see arrow R1) or the second direction (see arrow R2) such that the flattened surfaces 45 of the first leg 40 lie adjacent to the flattened surfaces 36 of the first interior surface 24. Thus, the first leg 40 can slide in the first bore 25.

The present inventor recognized that in certain examples, the first leg 40 preferably has three locking surfaces 43 that each engage flattened surfaces 45 of the first interior surface 24 to thereby reduce "wobbling" between the first leg 40 and the handle 20 when the hiking stick 10 is in the tripod configuration (FIG. 8).

In certain examples, the first leg 40 cannot slide in the second bore 27. For instance, the cross-sectional size of the first leg 40 is larger than the cross-sectional size of the second bore 27, and thus, the first leg 40 cannot fit or slide in the second bore 27. In addition, the cross-sectional size of the second leg 50 is smaller than the cross-sectional size of the first bore 25, and thus, while the second leg 50 can slide in the first bore 25, the second leg 50 cannot lock to the handle 20 while in the first bore 25. Thus, the first leg 40 must be positioned in the first bore 25 and the second leg 50 must be positioned in the second bore 27.

Figure 11:
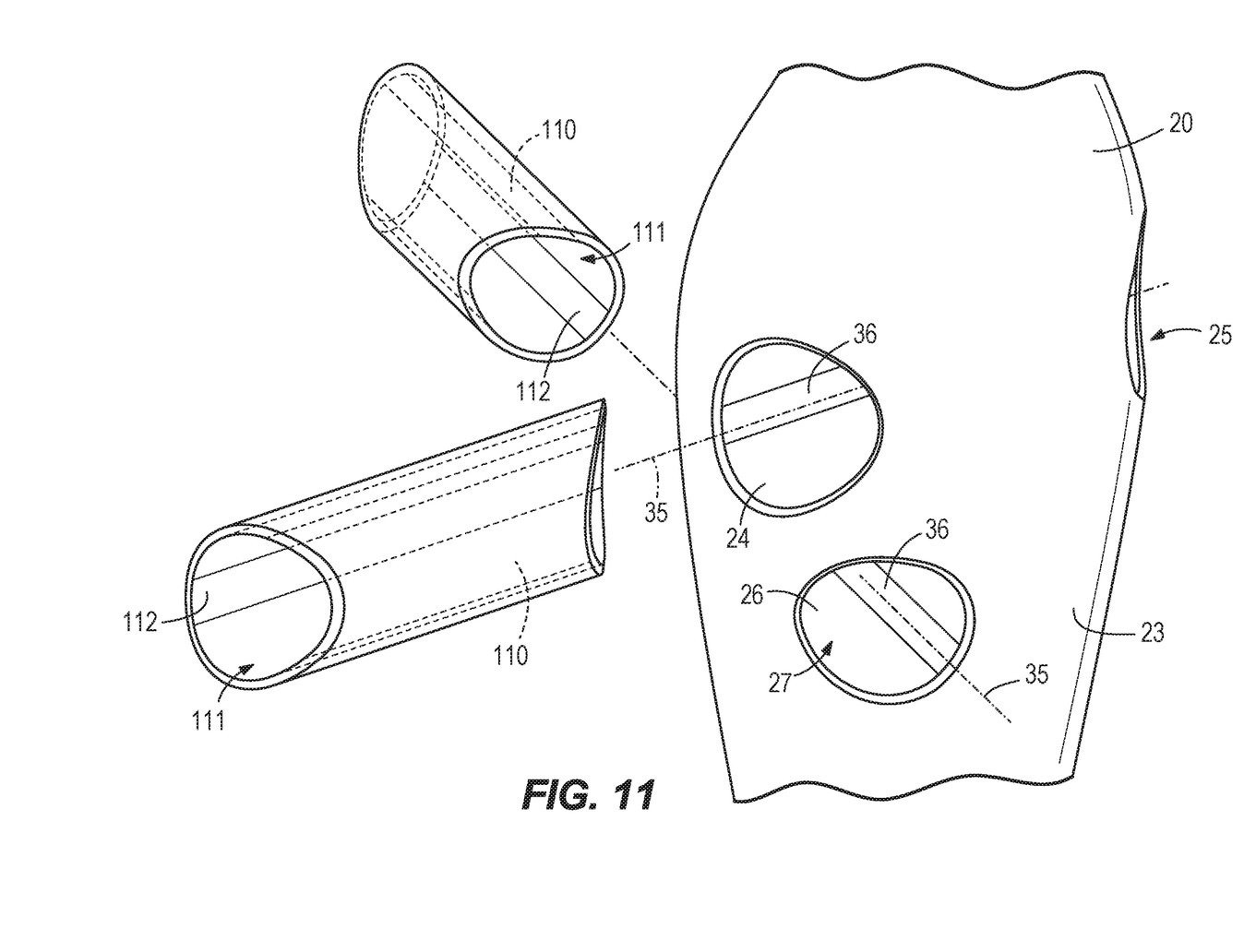
FIG. 11 is an exploded view of the handle and inserts.

In certain examples, the legs 40, 50 and/or the handle 20 are formed from elastic or compressible materials such that the legs 40, 50 or the handle 20 elastically deform as the legs 40, 50 move into the locked position (FIG. 10). In certain examples, the hiking stick 10 includes inserts 110 (FIG. 11) that fit within the bores 25, 27. The inserts 110 have center channels 111 that receive the legs 40, 50 (FIG. 8), and the shape and/or size of the inserts 110 corresponds to the shape and/or size of the bores 25, 27 and the legs 40, 50. Also, the inserts 110 have flattened surfaces 112. The inserts 110 are formed from an elastic or compressible material such that when the legs 40, 50 slide in the center channels 111 and rotate into unlocked positions (FIG. 9) or the locked positions (FIG. 10) the inserts 110 prevent direct contact between the legs 40, 50 and the interior surfaces 24, 26. Preventing direct contact of the legs 40, 50 with the interior surfaces 24, 26 may be desirable when the legs 40, 50 and the handle 20 are formed with carbon fiber materials. The inserts 110 are replaceable, and adhesives removably couple the inserts 110 to the interior surfaces 24, 26.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A convertible hiking stick comprising:
    a handle extending along a center axis, wherein the handle has a first bore spaced apart from a second bore; and
    a first leg and a second leg that are coupled to the handle and extend along the center axis;
    wherein the hiking stick is convertible into a tripod wherein the first leg is located in the first bore, the second leg is located in the second bore, wherein the first leg extends transverse to the second leg, and further wherein the first leg, the second leg, and the handle together support the hiking stick with respect to a surface;
    wherein the first leg is slideable in the first bore and the second leg is slideable in the second bore to thereby change the shape of the tripod; and
    wherein the first leg is rotatable in the first bore to thereby lock the first leg to the handle.

2. The convertible hiking stick according to claim 1, wherein when the first leg is rotated, a locking surface of the first leg engages a first interior surface of the handle.

3. The convertible hiking stick according to claim 1, wherein when the first leg is slid in the first bore, a locking surface of the first leg slides along a first interior surface of the handle that defines the first bore, and wherein when the first leg is rotated, the locking surface engages the first interior surface.

4. The convertible hiking stick according to claim 3, wherein the locking surface is one of a plurality of locking surfaces, and wherein the locking surfaces in the plurality of locking surfaces are spaced apart from each other along a perimeter of the first leg.

5. The convertible hiking stick according to claim 4, wherein the first leg includes three locking surfaces.

6. The convertible hiking stick according to claim 3, wherein the first leg has a non-cylindrical cross-sectional shape.

7. The convertible hiking stick according to claim 6, wherein the first bore has a non-cylindrical cross-sectional shape that corresponds to the non-cylindrical cross-sectional shape of the first leg.

8. The convertible hiking stick according to claim 1, wherein the first bore is a first through-bore and the second bore is a second through-bore.

9. The convertible hiking stick according to claim 8, wherein when the hiking stick is converted to the tripod, the first leg extends through the handle via the first through-bore and the second leg extends through the handle via the second through-bore.

10. The convertible hiking stick according to claim 9, wherein when the first leg and the second leg extend along the center axis, the first leg and the second leg are telescopic relative to each other and the handle.

11. The convertible hiking stick according to claim 9, wherein the handle defines an interior space therein, and wherein when the first leg and the second leg extend along the center axis, the first leg and the second leg are retractable into the interior space.

12. The convertible hiking stick according to claim 1, wherein the first bore extends along a first bore axis and the second bore extends along a second bore axis, and wherein the first bore axis and the second bore axis extend transversely to each other and the center axis.

13. The convertible hiking stick according to claim 1, wherein the first leg has a locking surface that engages a first interior surface of the handle when the first leg is in the first bore such that the first leg locks to the handle.

14. The convertible hiking stick according to claim 1, wherein when the first leg and the second leg extend along the center axis, the first leg and the second leg are telescopic relative to each other and the handle.

15. The convertible hiking stick according to claim 1, wherein the handle defines an interior space therein, and wherein when the first leg and the second leg extend along the center axis, the first leg and the second leg are retractable into the interior space.

16. The convertible hiking stick according to claim 15, wherein interior surfaces defining the first bore and the second bore extend into the interior space defined by the handle.

17. A convertible hiking stick comprising:
   a handle extending along a center axis, wherein the handle has a first bore spaced apart from a second bore; and
   a first leg and a second leg that are coupled to the handle and extend along the center axis;
   wherein the hiking stick is convertible into a tripod wherein the first leg is located in the first bore, the second leg is located in the second bore, wherein the first leg extends transverse to the second leg, and further wherein the first leg, the second leg, and the handle together support the hiking stick with respect to a surface;
   wherein the first leg is slideable in the first bore and the second leg is slideable in the second bore to thereby change the shape of the tripod; and
wherein the first leg is rotatable 60.0 degrees in a first direction while in the first bore to thereby lock the first leg to the handle.

18. The convertible hiking stick according to claim 17, wherein the first leg is rotatable 60.0 degrees in a second direction opposite the first direction to thereby unlock the first leg from the handle.

\* \* \* \* \*